US008456420B2

(12) United States Patent
Nachman et al.

(10) Patent No.: US 8,456,420 B2
(45) Date of Patent: Jun. 4, 2013

(54) AUDIBLE LIST TRAVERSAL

(75) Inventors: Lama Nachman, Santa Clara, CA (US); David L. Graumann, Portland, OR (US); Giuseppe Raffa, Beaverton, OR (US); Jennifer Healey, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 946 days.

(21) Appl. No.: 12/347,998

(22) Filed: Dec. 31, 2008

(65) Prior Publication Data

US 2010/0169097 A1  Jul. 1, 2010

(51) Int. Cl.
*G06F 3/033* (2006.01)
*G09G 5/08* (2006.01)

(52) U.S. Cl.
USPC ........... 345/158; 715/727; 715/728; 715/729; 704/258; 704/260

(58) Field of Classification Search
USPC ............. 704/258, 260; 715/727–729; 73/649; 345/156–158
See application file for complete search history.

(56) References Cited

U.S. PATENT DOCUMENTS

| 5,801,692 | A  | * | 9/1998  | Muzio et al. ................. | 715/764 |
| 7,174,295 | B1 | * | 2/2007  | Kivimaki ...................... | 704/260 |
| 7,180,500 | B2 | * | 2/2007  | Marvit et al. ................. | 345/156 |
| 7,809,573 | B2 | * | 10/2010 | Nishizaki et al. ............. | 704/270 |
| 7,845,234 | B2 | * | 12/2010 | Shimase ........................ | 73/649 |
| 2005/0045373 | A1 | * | 3/2005 | Born ............................. | 174/254 |
| 2006/0095848 | A1 | * | 5/2006 | Naik ............................. | 715/716 |
| 2007/0100883 | A1 | * | 5/2007 | Rose et al. .................... | 707/104.1 |

(Continued)

FOREIGN PATENT DOCUMENTS

JP  2002330473 A  * 11/2002
JP  2003087864 A  * 3/2003

(Continued)

OTHER PUBLICATIONS

F Chen, E Choi, et al, "A study of manual gesture-based selection for the PEMMI multimodal transport management interface", Proceedings of the 7th international conference on Multimodal interfaces.
C Muller-Tomfelde, S Steiner, "Audio enhanced collaboration at an interactive electronic whiteboard", International Conference on Auditory Display, Jul. 29-Aug. 1, 2001.

(Continued)

*Primary Examiner* — Talivaldis Ivars Smits
*Assistant Examiner* — Shaun Roberts
(74) *Attorney, Agent, or Firm* — Schubert Law Group PLLC

(57) ABSTRACT

Many embodiments may comprise logic such as hardware and/or code to implement user interface for traversal of long sorted lists, via audible mapping of the lists, using sensor based gesture recognition, audio and tactile feedback and button selection while on the go. In several embodiments, such user interface modalities are physically small in size, enabling a user to be truly mobile by reducing the cognitive load required to operate the device. For some embodiments, the user interface may be divided across multiple worn devices, such as a mobile device, watch, earpiece, and ring. Rotation of the watch may be translated into navigation instructions, allowing the user to traverse the list while the user receives audio feedback via the earpiece to describe items in the list as well as audio feedback regarding the navigation state. Many embodiments offer the user a simple user interface to traverse the list without visual feedback.

30 Claims, 7 Drawing Sheets

U.S. PATENT DOCUMENTS

| | | | | |
|---|---|---|---|---|
| 2007/0192027 A1* | 8/2007 | Lee et al. | | 701/211 |
| 2007/0232335 A1* | 10/2007 | Harada et al. | | 455/466 |
| 2008/0254821 A1* | 10/2008 | Kusuda et al. | | 455/550.1 |
| 2009/0063974 A1* | 3/2009 | Bull et al. | | 715/716 |
| 2009/0075694 A1* | 3/2009 | Kim et al. | | 455/556.1 |
| 2009/0313564 A1* | 12/2009 | Rottler et al. | | 715/764 |

FOREIGN PATENT DOCUMENTS

| | | | |
|---|---|---|---|
| JP | 2003/345333 A | 12/2003 | |
| JP | 2005/251008 A | 9/2005 | |
| JP | 2006/004292 A | 1/2006 | |
| JP | 2006/163460 A | 6/2006 | |
| JP | 2008/159070 A | 7/2008 | |
| JP | 2009/533762 A | 9/2009 | |
| WO | 2007/120562 A2 | 10/2007 | |

OTHER PUBLICATIONS

F Chen, E Choi, et al, "A study of manual gesture-based selection for the PEMMI multimodal transport management interface", Proceedings of the 7th international conference on Multimodal interfaces, Oct. 2005.

Fishkin, Gujar, Harrison, Moran, Want. "Embodied user interfaces for really direct manipulation" Communications of the ACM vol. 43, Issue 9 p. 74-80, Sep. 2000.

Strachan, Murray-Smith, O'Madhrain, "BodySpace: Interring body pose for natural control of a music player", Apr. 28-May 3, 2007.

Japanese Office Action received for Japanese Patent Application No. 2009-295042, mailed on May 8, 2012, 2 Pages of Office Action and 2 Page of English Translation.

* cited by examiner

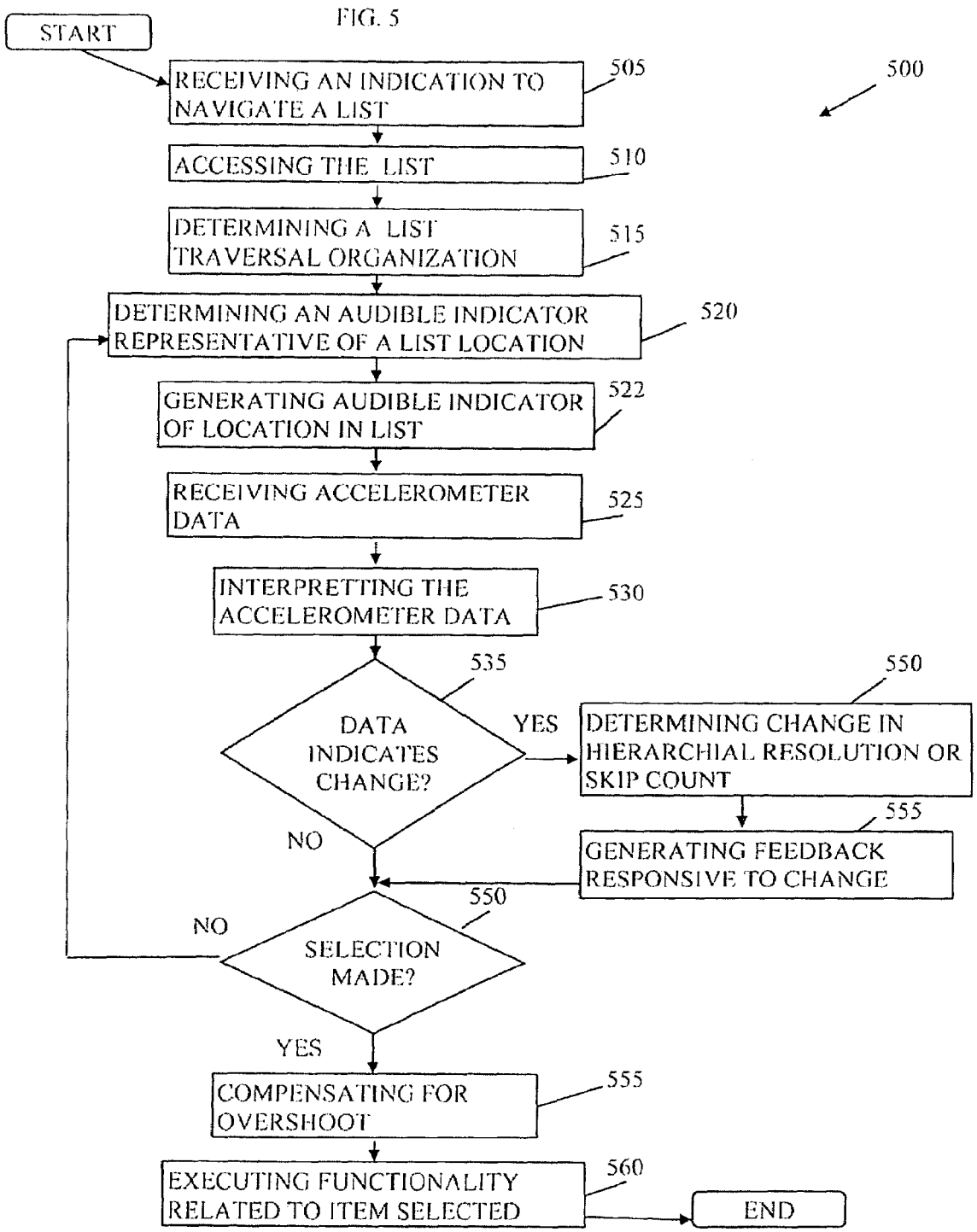

AUDIBLE LIST TRAVERSAL

FIELD

The present disclosure relates generally to user interface technologies. More particularly, the present disclosure relates to devices such as mobile devices with an interface to traverse a list via audible mapping of the list such as playlists for an MP3 (Moving Picture Experts Group, MPEG-1, Audio Layer-3) player, contact lists, or other information compatible with presentation as an audible list.

BACKGROUND

A mobile device such as a cellular phone, handheld device, handheld computer, "Palmtop", Mobile Internet Devices (MIDs) or the like is typically a pocket-sized computing device having a user interface such as a display screen with touch input or a miniature or micro keyboard. Many personal digital assistants (PDAs) integrate the inputs and outputs with a touch-screen interface.

Mobile devices such as Smartphones, PDAs, and Enterprise digital assistants (EDAs) are popular tools for those whom require the assistance and convenience of a conventional computer in environments where carrying one would not be practical. EDAs offer functionality for the business user such as integrated data capture devices like Bar Code, Radio Frequency Identification (RFID) and Smart Card readers. As is the case with many PDAs, EDAs may also include a Touch Screen, an Infrared Data Association (IrDA), Bluetooth®, and a Memory card slot.

As mobile devices become more capable in processing, communication and storage, new applications are emerging to take advantage of these capabilities and the inherent mobility of these devices. Mobility, however, imposes several constraints on the types of interaction users of mobile devices can be involved in. It is increasingly common for users to use of the device capabilities (calendar, contacts, location based services, . . . ) when a visual interaction is inappropriate. Examples of such situations are situations in which the user is physically active (walking, running, driving); the device is not reachable (e.g.: in the purse or pocket); the screen is too small for a quick interaction; or the user is engaged in demanding activities or at least visually demanding activities.

Due to the form factor constraints, the user interface has become the main limiter on practical usage of mobile devices. For instance, having a full size keyboard and display are clearly not a practical option for use with mobile devices. In lieu of a full size keyboard, many mobile devices incorporate micro keyboards, key pads, or a unique combination of keys and buttons, which are less than ideal and are not conducive with multi-tasking.

BRIEF DESCRIPTION OF THE DRAWINGS

FIG. 5 illustrates a flow chart of an embodiment for traversing a list via audible mapping of the list.

DETAILED DESCRIPTION OF EMBODIMENTS

Figure 1:
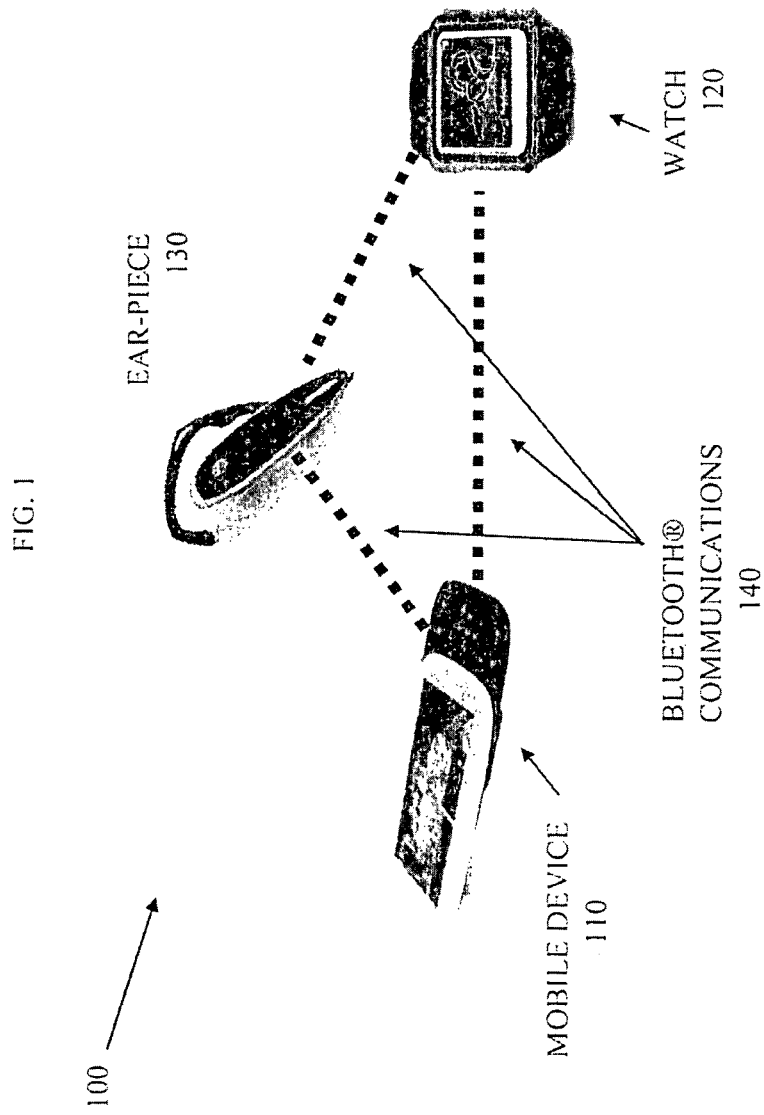
FIG. 1A depicts an embodiment of a system including a mobile device, a watch, and an earpiece.
FIG. 1B depicts an embodiment of wrist rotation for controlling navigation speed.
FIG. 1C depicts an embodiment of a state diagram for a system including a mobile device, a watch, and an earpiece.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, embodiments for traversing a list are described herein. Many embodiments may comprise logic such as hardware and/or code to implement user interface (UI) for traversal of long sorted lists, via audible mapping of the lists, using sensor based gesture recognition, audio and tactile feedback and button selection while on the go. In several embodiments, such UI modalities are physically small in size, enabling a user to be truly mobile by reducing the cognitive load required to operate the device. For instance, in some embodiments, the user interface may be divided across multiple worn devices, including a mobile device, a watch, an earpiece, and, in several embodiments, a ring. Coordinated movement of the watch may be translated into navigation instructions, allowing the user to traverse the list while the user receives audio feedback, or audible indicators, via the earpiece to describe items in the list as well as the navigation state such as the speed and direction of traversal of the list. In further embodiments, selection of a list item via depression of a button on the ring may activate the selected item, navigate to a sub-list or the like. Thus, many embodiments offer the user a simple user interface to traverse the list via audible mapping and several of these embodiments do so without visual feedback.

Embodiments may facilitate wireless communications. Wireless embodiments may integrate low power wireless communications like Bluetooth®, wireless local area networks (WLANs), wireless metropolitan area networks (WMANs), wireless personal area networks (WPAN), cellular networks, and/or Institute of Electrical and Electronic Engineers (IEEE) standard 802.15.4, "Wireless Medium Access Control (MAC) and Physical Layer (PHY) Specifications for Low Rate Wireless Personal Area Networks (LR-WPANs)" (2006) (http://standards.ieee.org/getieee802/download/802.15.4-2006.pdf), communications in the mobile device, watch, earpiece, and ring to facilitate interaction between such devices.

Furthermore, some wireless embodiments may incorporate a single antenna while other embodiments may employ multiple antennas. For instance, multiple-input and multiple-output (MIMO) is the use of multiple antennas at both the transmitter and receiver to improve communication performance. MIMO technology offers significant increases in data throughput and link range without additional bandwidth or transmit power. It achieves this by higher spectral efficiency (more bits per second per hertz of bandwidth) and link reliability or diversity (reduced fading).

Other embodiments may implement some or all communications via physical media that interconnects two or more devices such as the mobile device, watch, earpiece, and the ring. In some of these embodiments, the physical media interconnecting such devices may be integrated with clothing.

While some of the specific embodiments described below will reference the embodiments with specific configurations, those of skill in the art will realize that embodiments of the present disclosure may advantageously be implemented with other configurations.

Turning now to FIG. 1, there is shown an embodiment of a system 100. System 100 comprises a mobile device 110, a watch 120, and an earpiece 130. The mobile device 110 in this embodiment is a mobile Internet device (MID) and cellular phone. The mobile device 110 may contain, or provide access to, a list through which a user will traverse. For instance, the cellular phone may comprise a contact list or phone book stored locally. Access to the menu system, preferences, email, text messages, etc., may also be accessible in a list and sub-list format. Furthermore, the cellular phone may have access to the Internet or other wireless networks, allowing the user to access a number of remote lists.

The mobile device 110 may comprise or have access to content in a list format and, in the present embodiment, the user may interact with the mobile device 110 remotely, allowing the mobile device 110 to remain in the pocket, purse, or bag. Remote communication may be accomplished via wireless communication formats. Wireless embodiments may integrate low power wireless communications like Bluetooth® and/or Institute of Electrical and Electronic Engineers (IEEE) standard 802.15.4 communications in the mobile device, watch, earpiece, and ring. The standard, IEEE 802.15.4™, provides for low-data-rate connectivity among relatively simple devices that consume minimal power and typically connect at distances of 10 meters (30 feet) or less. IEEE 802.15.4™, addresses fixed, portable and moving devices that operate at data rates of 10 to 250 kbps. The standard allows devices to form short-range ad hoc networks within which they can interact directly.

In some embodiments, the list may be in an audible format. In other embodiments, the list may comprise text and the mobile device 110 may translate the items on the list into audible indicators via, e.g., text-to-speech conversion logic, or the like.

The watch 120 may measure physical movement by a user to determine the direction and speed of traversal of the list. In the present embodiment, the watch 120 comprises a built-in three dimensional (3-D) accelerometer or a gyroscopical sensor to monitor an amount of tilt of the user's wrist. In other embodiments, the watch may comprise a 2-d accelerometer or one or more tilt sensors or switches. Furthermore, the watch 120 may comprise a battery that vibrates upon receipt of instructions from the mobile device 110 to give the user some feedback related to logical list boundaries and/or navigation boundaries as such boundaries are approached or crossed.

In the present embodiment, the watch 120 also comprises a button (not shown). The user may depress the button to select or execute the item of interest in the list. For instance, upon traversing the list to the item of interest, the user may depress a button on the watch 120 to generate a selection signal to transmit to the mobile device 110. In other embodiments, the user may release the button to select the item of interest. In further embodiments, the button may be a capacitive switch, a heat sensitive switch, or other type of switch that the user can activate without physically moving or at least noticeably moving the button.

The earpiece 130 will play back audible indicators to the user to help the user navigate the list to an item of interest. Reaching the item of interest may be the goal in some instances because the earpiece may play an audible indicator of the listed item such as a text-to-speech annunciation of the text of the item. In other instances, selecting the item may allow the user to enter into a sub-list of items. For example, the list may comprise names and phone numbers from contact information stored in the mobile device 110. Upon reaching the name of interest, the full name and phone number of the item of interest may be communicated to the user. In further embodiments, once the user navigates to the item of interest, he/she can use either a button on the watch or one embedded in a ring to select the item, executing a function related to the item such as entering a sub-list or playing audio content associated with the selected list item.

Figure 1B:
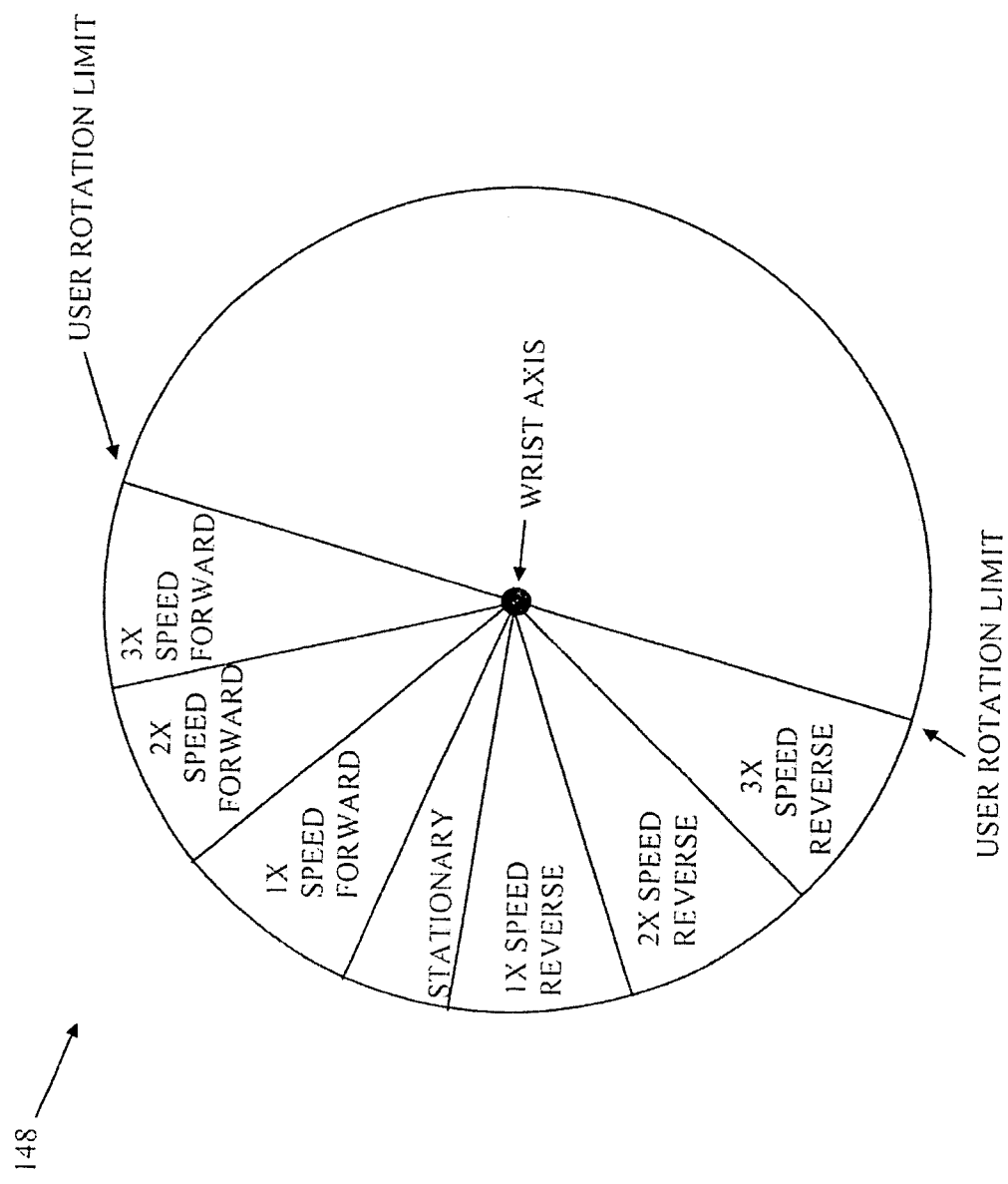

FIG. 1B illustrates an embodiment 148 of wrist rotation or tilt for controlling navigation speed from the perspective of the user looking forward along an axis perpendicular to the rotation of the wrist. While FIG. 1B can be applicable to other embodiments, FIG. 1B describes rotation of a right wrist of a user wearing the watch 120 in FIG. 1A. Note that if the watch 120 is worn on the user's left wrist, the stationary position may reside at a range of about three to four o'clock and, as with FIG. 1B, reverse navigation speeds may be counter-clockwise of the Stationary position and forward navigation speeds may be clockwise of the Stationary position.

In many embodiments, the range or number of degrees between 3× Speed Reverse and 3× Speed Forward may be adjustable. In further embodiments, each of the various aspects of the wrist rotation shown in FIG. 1B can be changed or adjusted via user preferences. For instance, in some embodiments, forward navigation speeds may increase with rotation of the wrist counter-clockwise, more navigation speeds may be available or an ever-increasing speed may be available based upon the granularity of the sensor that monitors the tilt or rotation of the wrist or the granularity of a navigation input interpreter, which comprises logic to interpret raw data from, e.g., an accelerometer, a gyro, tilt sensors, or the like. In other embodiments, less navigation speeds may be available and/or a smaller range of movement may be required to access those speeds.

In the present embodiment, the Stationary position indicates that the user instructs the mobile device 110 to remain on or hover at the current list item. The 1× Speed Forward position indicates that the user instructs the mobile device 110 to traverse the list toward the end of the list at a 1× Speed. For example, a 1× Speed may involve generation of audible indicators corresponding to a full recitation each item in the list, one-by-one, sequentially, toward the end of the list. In some embodiments, the navigation speed in terms of items per unit in time may vary while at the 1× Speed because the amount of time to perform a full recitation of each item in a list may differ from item to item.

In other embodiments, the 1× Speed may represent generation of audible indicators corresponding to a fixed length of time such as a 3 second recitation of each item in the list. The fixed length of time for each item may involve truncating the recitation of the list item to create an audible indicator, time-compressing the audible indicator to be a specified length of time, or otherwise ensuring that the audible indicator for each item in the list is a fixed length of time. In some embodiments, the fixed length of time represented by 1× Speed Forward may be based the number of items in the list. In many of such embodiments, the 1× Speed may be calculated based upon the number of items in the list By rotating or tilting the wrist further clockwise, the user may instruct the mobile device 110 to increase the navigation speed to 2× Speed Forward or 3× Speed Forward. Note that 1× Speed Reverse, 2× Speed Reverse, and 3× Speed Reverse may be the same navigation speeds as 1× Speed Forward, 2× Speed Forward, and 3× Speed Forward, respectively, except in the reverse direction. In other words, Reverse may progress toward the start or beginning of the list whereas Forward progresses toward the end of the list. In some embodiments, the beginning and the end of the list may be relative to the position in the list at which the user begins navigation. In the present embodiment, 1× Speed Reverse, 2× Speed Reverse, and 3× Speed Reverse may be accessed by rotating or tilting the wrist counter-clockwise to different degrees.

In some embodiments, 2× Speed may involve audible indicators of a shorter duration than the audible indicators utilized for the 1× Speed or may involve audible indicators that comprise partial recitations of the items in the list. For example, the list may comprise audible indicators representative of text of items in the list. The 1× Speed in such embodiments may represent audible indicators that comprise a full, text-to-speech audio clip at normal speed and 2× Speed may represent audible indicators that are either the full, text-to-speech audio clip at twice the speed or some portion of the clip at normal speed or a faster than normal speed.

Hierarchical Resolution of List Items

In other embodiments, rather than truncating or time-compressing the audible indicator to increase the navigation speed, a hierarchy of audible indicators may be used to represent groups of items in the list. For instance, the list may comprise a song list and the items in the list may be text of the song titles. In such an embodiment, 1× Speed may allow for recitation of the name of each song in the list. Alternatively, in the faster speed such as 2× Speed, song titles in the list are divided into groups of songs based on the first letter of the song. As each group is traversed, the mobile device 110 will transmit an audible indicator to the earpiece to annunciate the name of the first song in the group (or just say the letter representing that group). This approach can be extended to multiple levels. At 3× Speed, for example, the songs may be grouped into multiple letters (e.g. A-D, E-H, etc). Alternatively, at 2× Speed, the song titles may be divided into multiple groups per letter such as (AA-AD, AE-AH, etc) and at 3× Speed, the song titles may be divided alphabetically by the first letter in the song title (e.g., A, B, C, etc). In this approach, the different groups are formed based on some attribute of the list given the speed and size, so group occupancy might not be uniform across groups.

Other embodiments may map the different levels of the hierarchy to different attributes. For instance, a list of songs may be grouped by artists at the top level, e.g., 3× Speed, albums at the level below, e.g., 2× Speed, and songs within an album at the lowest level, e.g., 1× Speed. The mobile device can map the different "speeds" to navigating through the levels of hierarchy (highest speed navigates through artists, middle speed navigates through albums and lowest speed navigates through songs). In some embodiments, the mobile device 110 may also combine the sub-letter resolution mentioned above with this concept as well, to leverage more "speeds".

Variable Skip Count Resolution of List Items

An alternative embodiment for implementing various navigation speeds is to skip annunciating N items based on the navigation speed N rather than divide the list into groups based on some criteria. For the lowest speed such as 1× Speed, the mobile device 110 may not skip any items (e.g. every item is annunciated sequentially in the direction of traversal of the list). At the next speed such as 2× Speed, the mobile device 110 may generate audible indicators for item x; followed by item x+N (skips N items) and transmit those audible indicators to the earpiece 130 to communicate the audible indicators to the user.

In several embodiments, the mapping between the speed and the number of items the mobile device skips may depend upon the list size, user preferences, and the longest amount of time needed to annunciate an item in the list. Note that the number of items traversed between two outputs may be constant for a given speed.

Further embodiments may implement other means to shorten the length of time required for annunciating each item. So long as the shortened audio can communicate an important feature of that audio to the user, the audio may serve its intended purpose.

Figure 1C:
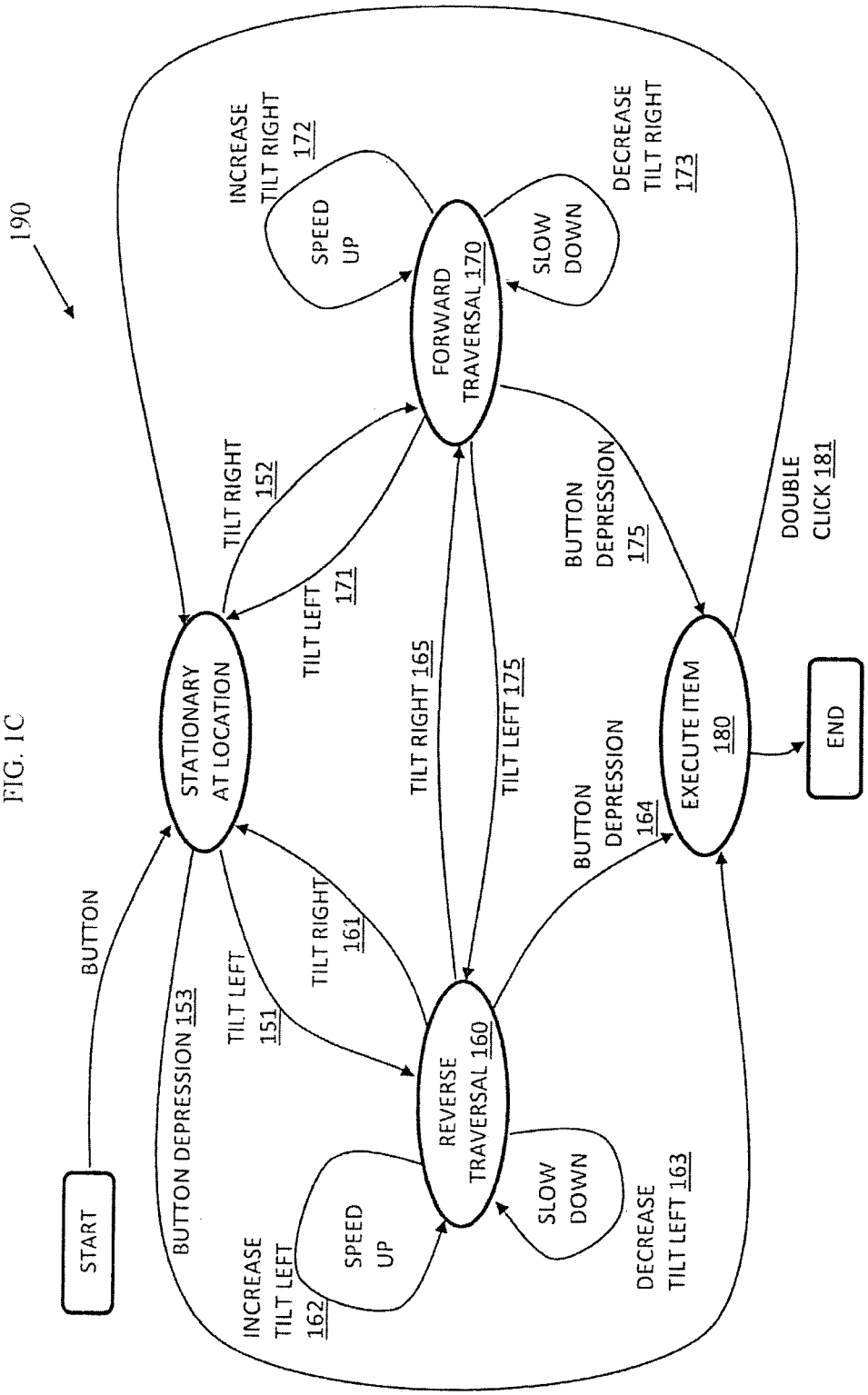

FIG. 1C illustrates a state diagram 190 of an embodiment such as system 100 in FIG. 1A. This state diagram 190 begins at state 150, wherein the mobile device 110 may annunciate an audible indicator of the first item at the start of a list, which is flagged as the current list item. In some embodiments, the mobile device 110 may track the last item accessed in a list and set that item as the current list item upon selecting the list for traversal.

From state 150, the user may tilt the watch 120 left 151 (rotating the watch 120 clockwise) to traverse forward through the list, tilt the watch 120 right (rotating the watch 120 counter-clockwise) to traverse the list in reverse, or depress a button to select or execute the current item in the list 180. Note that if the current list item is the first item in the list, tilting the watch 120 left 151 may transmit navigation data indicative of a navigation state change to the mobile device 110 to change the navigation speed to a reverse speed. A list navigator of the mobile device 110 may determine that the current list item is the first item in the list and produce feedback to indicate the same to the user. For instance, the list navigator may generate an audible indicator that the current location is at the beginning of the list and/or may output a signal to instruct a vibration device of watch 120 to vibrate to indicate that the current list item is at the beginning of the list. Several embodiments offer the same or similar features to indicate that the current list item is at the end of the list.

Assuming that the current position is not at the beginning or the end of the list, tilting the watch 120 left 151 instructs the mobile device 110 to begin traversing the list at a navigation speed corresponding to the tilt of the watch 120 toward the beginning of the list and changes the navigation state to the reverse traversal state 160. At the reverse traversal state 160, the user may change the navigation state by tilting right 161 to return the navigation state to the Stationary state 150 (Stationary position), increasing the tilt of watch 120 to the left 162 to speed up the reverse navigation speed for traversal of the list, reducing the reverse navigation speed (e.g., from 2× Speed to 1× Speed) by reducing the tilt to the left 163, depressing the button 164 to execute the current list item 180, or tilting the watch 120 to the right of the Stationary position 165 to change the navigation state to the forward traversal state 170.

At forward traversal state 170, the user may change the navigation state by tilting left 171 to return the navigation state to the Stationary state 150 (Stationary position), increasing the tilt of watch 120 to the right 172 to speed up the forward navigation speed of the list, reducing the forward navigation speed (e.g., from 3× Speed to 1× Speed) by reducing the tilt to the right 173, depressing the button 175 to execute the current list item 180, or tilting the watch 120 to the left of the Stationary position 175 to change the navigation state to the reverse traversal state 160.

After transitioning to the Execute Item state 180, the selected item may execute. For instance, if the selected item is a title of a song, the list navigator may play the song. On the other hand, if the item is a main menu for a digital music player on a multi-purpose computer, executing the item may transition the list navigator to a sub-list, which may include a listing of playlists, a library of songs, or the like. The user may then traverse the sub-list to execute an item on the sub-list such as a song. Alternatively, in the present embodiment, the user has an option to double-click 181 the button to return the navigation state to the Stationary state 150 with the selected item returned to the status of current list item rather than selected item.

Figure 2:
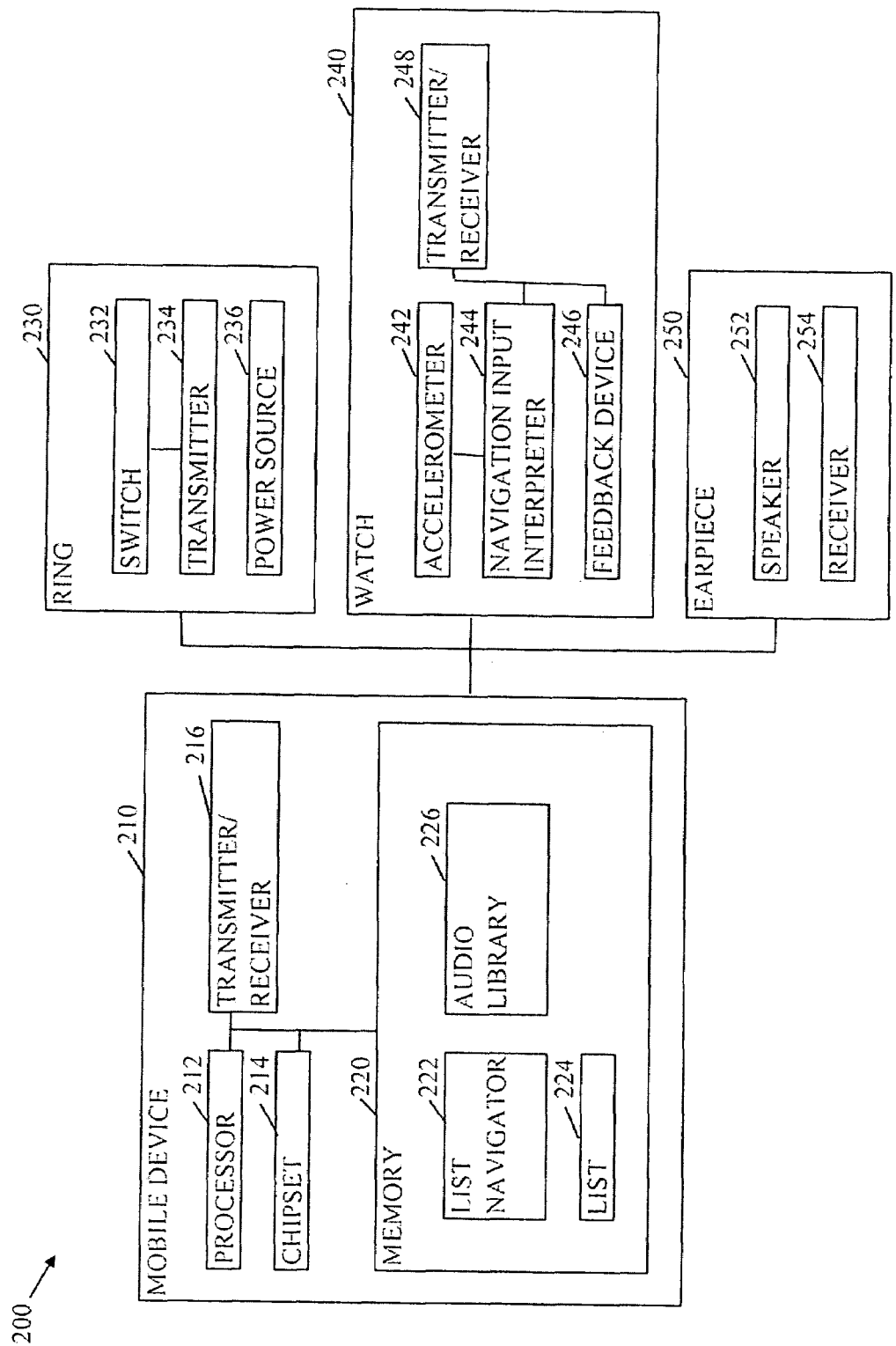
FIG. 2 depicts an embodiment of a system including a mobile device, a watch, a ring, and an earpiece.

FIG. 2 depicts a system 200 to traverse a list 224 to execute a selected list item. System 200 may comprise a mobile device 210, a ring 230, a watch 240, and an earpiece 250. The mobile device 210 may comprise a Nettop, a Netbook, a cellular phone, a personal data assistant (PDA), a laptop, or the like. In other embodiments, functionality of system 200 may be integrated into non-mobile or less than mobile devices such as desktop computers, game consoles, servers, and the like. The mobile device 210 may provide access to one or more lists and may communicatively couple with the watch 240 and the earpiece 250 and with the ring 230 via the watch 240. In some embodiments, the mobile device 210 may also communicatively couple with the ring 230 directly rather than through an interface of the watch 240. For example, the mobile device 210 may comprise navigation code as well as a global positioning system and map data to offer routing information to a user. The mobile device 210 may comprise a list 224 of destinations in memory 220 and the user may access the list 224 of destinations via an audible mapping of the list 224 in the form of audible indicators stored in an audio library 226.

The mobile device 210 may comprise a processor 212, a chipset 214, a transmitter/receiver 216, and the memory 220. The processor 212 may receive and execute code such as a list navigator 222 via the chipset 214. The processor 212 may comprise, for instance, one or more Intel® Atom™ processors and the chipset 214 may comprise, for instance, an Intel® 945GC Express Chipset or a Mobile Intel® 945GSE Express Chipset.

The chipset 214 may comprise a system controller hub to coordinate communications between the processor 212 and the memory 220, the transmitter/receiver 216, and potentially other devices such as a display, a Peripheral Component Interconnect (PCI) bus, a Universal Serial Bus (USB), a network bus, or the like. For example, the chipset 214 may receive communications from the watch 240 including data from an accelerometer 242 via a navigation input interpreter 244 and the transmitter/receiver 248. The chipset 214 may also transmit communications from processor 212 to the watch 240 and the earpiece 250.

In the present embodiment, the chipset 214 may retrieve instructions and data from memory 220 in response to requests from the processor 212 to execute the list navigator 222. The instructions and data may comprise logic to interpret accelerometer data from accelerometer 242 and data regarding the state of switch 232. The instructions and data may also comprise logic to select audible indicators from the audio library 226 based upon the list 224 to transmit to the earpiece 250 to sound the audible indicators via a speaker 252. For example, the list navigator 222 may facilitate navigation by a user through an audio mapping of the list 224. The list navigator 222 may comprise instructions, which, when executed by the processor 212, cause the processor to select from a number of audio indicators such as sound clips in the audio library 226 to transmit to the earpiece 250 to indicate the current list item at which the list navigator currently points.

The list navigator 222 may also select from a number of different audio indicators for different positions within the list 224 based upon the speed at which the user indicates to traverse the list. In some embodiments, the list navigator 222 may comprise a formula for calculating a number of items to skip prior to transmitting audio indicators related to current list items to the earpiece 250.

The transmitter/receiver 216 may comprise a wireless communications circuit for communicating with the watch 240 and the earpiece 250. In the present embodiment, the mobile device 210 receives communications from the ring 230 via the transmitter 234 and the transmitter/receiver 248 of the watch 240 to minimize the distance of the transmission to conserve power expended by transmitter 234. In other embodiments, transmitter 234 may be coupled with the watch 240 via a physical communications medium or may couple with transmitter/receiver 216 directly via a wireless or wired communications medium.

The transmitter/receiver 216 may also communicate with other devices that are not shown such as a wireless router to provide access for mobile device 210 to other local area networks, wide area networks, or the like. In one embodiment, for instance, transmitter/receiver 216 may comprise an Ethernet adapter to couple with a Ethernet network and a USB adapter to couple with a computer system, an external storage device, a peripheral, or other such devices.

The memory 220 may store code and data for execution by the processor 212, one or more lists such as list 224, as well as audible indicators in the audio library 226. The memory 220 may comprise one or more different types of data storage including random access memory, read only memory, flash memory, a magnetic storage medium such as a hard drive, an optical storage medium such as a compact disk drive, a digital video disk medium, or the like.

In the present embodiment, the memory 220 comprises at least the list navigator 222, the list 224, and the audio library 226. The list navigator 222 provides a user interface for accessing lists such as the list 224. The list navigator 222 may be initiated upon powering up the mobile device 210 or upon selection of the list navigator 222 by the user. In some embodiments, the list navigator 222 may be initiated upon identification of devices such as the watch 240 or identification of the accelerometer 242 whether or not included within the watch 240.

The list navigator 222 may start by selecting a current list item within the list 224. The current list item may be identified by storing a flag or pointer in memory 220. The user may then traverse the list 224 by tilting the watch 240. While traversing the list 224, the list navigator 222 may generate audible indicators indicative the speed and direction of traversal of the list 224. The list navigator 222 may generate the audible indicators by selecting audible indicators that are associated with list items being traversed from the audio library 226 and transmitting the audible indicators to the earpiece 250 to sound the audible indicators in the user's ear.

Tilting the watch 240 left, for instance, may produce accelerometer data from accelerometer 242. The navigation input interpreter 244 of watch 240 may determine that the tilt represents a change in navigation based upon the granularity of the navigation input interpreter 244. In some embodiments, this granularity may be a preference set by the user via a user interface of the watch 240 or by the mobile device 210. For example, the navigation input interpreter 244 may receive raw data from the accelerometer 242 and wait until the watch 240 is tilted by a specified magnitude or threshold in a particular direction (such as a certain number of degrees) prior to determining that the user has indicated a change in the state of the navigation of the list 224. Upon reaching the threshold, the navigation input interpreter 244 may transmit navigation data to the mobile device 210 via transmitter/receiver 248 that is indicative of the change in the tilt of the watch 240. The threshold may be set by code in the watch 240, may be set by the mobile device 210, may be the smallest amount of change determinable by (i.e., the granularity of) the accelerometer 242, or may be the minimum amount of change that can be monitored by (i.e., the granularity of) the navigation input interpreter 244.

The list navigator 222 may receive the navigation data from the watch 240 and determine whether the change in the tilt of the watch 240 represents an instruction from the user to change the navigation state such as the speed and/or direction of traversal of the list 224 as described in the state diagram 190 in FIG. 1C. In some embodiments, any change indicated by the navigation input interpreter 244 represents a change in at least the navigation speed. In further embodiments, the granularity of the navigation input interpreter 244 is smaller than the threshold of tilt at which the list navigator 222 will change the navigation state. For example, the user may tilt the watch 240 by 2 degrees to the left. The navigation input interpreter 244 may determine that the change in tilt surpasses the threshold to transmit the navigation data to the mobile device 210 and thus, generates the navigation data and transmits the navigation data to the mobile device 210.

In some embodiments, the list navigator 222 may generate a feedback signal in response to the change indicated by the navigation input interpreter 244 that represents how close the list navigator 222 is to determining that the navigation state will be changed. The list navigator 222 may transmit the feedback signal to a feedback device 246 of watch 240. For example, the feedback device 246 may generate vibrations at a rate indicated by the feedback signal and the list generator 222 may generate feedback signals that increase the frequency of the vibration by the feedback device 246 as the tilt of the watch 240 approaches a magnitude that will cause the list navigator 222 to change the navigation speed. In some embodiments, the list navigator 222 decreases the vibration in frequency as the user changes the tilt of the watch 240 in a direction that approaches a change in state to a slower navigation speed. In other embodiments, the feedback device 246 may be located in another element other than the watch 240. The feedback device 246 may provide an indication to the user that a change in the speed has occurred.

Based upon the extent of the change indicated by the navigation data and the current navigation state, the list navigator 222 may change the navigation speed and/or the direction of traversal through the list 224. Changing the speed of traversal through the list 224 may involve selecting a different level hierarchy of audible indicators to transmit to the earpiece 250 during traversal through the list 224 or selecting a number of items for which transmission of audible indicators is skipped between transmissions of audible indicators. Each of the audible indicators may represent one or more of the items in the list as the items are being traversed.

In some embodiments, the list navigator 222 may only comprise logic to change speed by changing to a different level of hierarchy of audible indicators. In other embodiments, the list navigator 222 may only comprise logic to change speed by changing the number of listed items that are skipped between transmissions of audible indicators representative of listed items. In further embodiments, the list navigator 222 may comprise logic for hierarchical resolution, variable skip count resolution, as well as other methods of traversing through the list 224 at different speeds and may select the method based upon a user preference. The user preference may be stored in memory 220 or selected by the user via other means such as by pressing a button on the mobile device 210, ring 230, watch 240, or earpiece 250.

Changing the direction of traversal may involve reversing the order with which the items are traversed. To communicate or map the reversed direction and navigation speed to the user in an audio space, the list navigator 222 selects a hierarchical group of audible indicators representative of the speed or a number of items to skip and reverses the order with which audible indicators are transmitted to the earpiece 250.

The list navigator 222 may also select an item in the list upon receipt of a selection signal from a switch 232 of the ring 230. For instance, as the list navigator 222 generates audible indicators by transmitting the audible indicators to the earpiece 250 to be sounded, the user may press a button on the ring 230 to indicate selection of the current list item. In some embodiments, the list navigator 222 may select the item that is flagged as the current list item. In other embodiments, the list navigator 222 may comprise overshoot compensation logic. Overshoot compensation logic may determine which item is selected by the user by accounting for a delay between traversing the item in the list 224 and receiving a selection signal from the ring 230.

The list 224 may comprise any data or information that may be traversed sequentially. For example, the list 224 may comprise a list of songs, radio stations phone numbers, contacts, web sites, etc. The list 224 may even comprise a list of functions that the mobile device 210 such as opening contacts, opening text messages, opening email, opening a web browser, entering a menu of preferences, or the like. In the present embodiment, the list 224 may comprise textual items and each item in the list 224 may be associated with one or more audible indicators in the audio library 226. For example, if list 224 comprises a menu from which the user may choose different functions of the mobile device 210. Each menu item may be associated with a unique audio indicator such as a sound clip. Accessing a calling feature of the mobile device 210 may involve selecting a list item that is identified by an audible indicator that sounds like a telephone ringing. In further embodiments, the list navigator 222 may comprise a text-to-speech conversion logic so that speech may be generated on-the-fly for lists that a user may want to navigate.

The ring 230 may offer a convenient and intuitive way to "grab" the item in the list 224 to select or execute that item. For instance, a button may be located at the bottom of the ring 230 and upon reaching an item of interest in the list 224, the user may touch the button with the user's thumb to activate the switch 232, offering the user a natural movement typically related to grabbing an object. In other embodiments, the switch 232 may be located on a different device such as earpiece 250 that is communicatively coupled with the mobile device 210.

The ring 230 may also comprise wireless communications capabilities via transmitter 234 such as a Bluetooth® transmitter. The ring 230 may maintain the switch 232 in a convenient location for a user to activate or actuate the switch 232. In the present embodiment, the ring 230 is wirelessly connected with the watch 240. Upon changing the state of the switch 232, the transmitter 234 may transmit the selection signal to the watch 240 and the watch 240 may transmit the selection signal to the mobile device 210. In the present embodiment, the ring 230 comprises a power source 236 such as a lithium ion battery or other power storage device to power the transmitter 234.

The watch 240 may offer any of a variety of watch functions. In the present embodiment, the watch 240 comprises the accelerometer 242, the navigation input interpreter 244, the feedback device 246, and the transmitter/receiver 248. In some embodiments, the watch 240 transmits raw data to the mobile device 210. In the present embodiment, the watch 240 comprises the navigation input interpreter 244 to process the accelerometer data to produce navigation data prior to transmitting the navigation data to the mobile device 210. In other embodiments, the watch 240 may comprise a motion sensor such as one or more tilt switches, a gyroscopic sensor, a 3-D accelerometer, or other sensor capable of monitoring the tilt of the watch 240.

The earpiece 250 may be any type of earpiece or headset that can sound the audible indicators to the user. The earpiece 250 comprises the speaker 252 and a receiver 254. The speaker 252 producers the sounds and the receiver 254 may receive an audible indicator and transmit the signal to the speaker 252 in an appropriate format. For example, if the receiver 254 is coupled with the mobile device 210 via a physical medium, the receiver 254 may comprise a pre-amplifier or impedance matching circuitry. In other embodiments, the receiver 254 may comprise a wireless receiver to receive the audible indicators as wireless signals. In further embodiments, the receiver 254 may comprise a digital receiver, either wired or wireless, and may comprise logic to convert the digital signal to an analog signal that may be sounded by the speaker 252.

Figure 3:
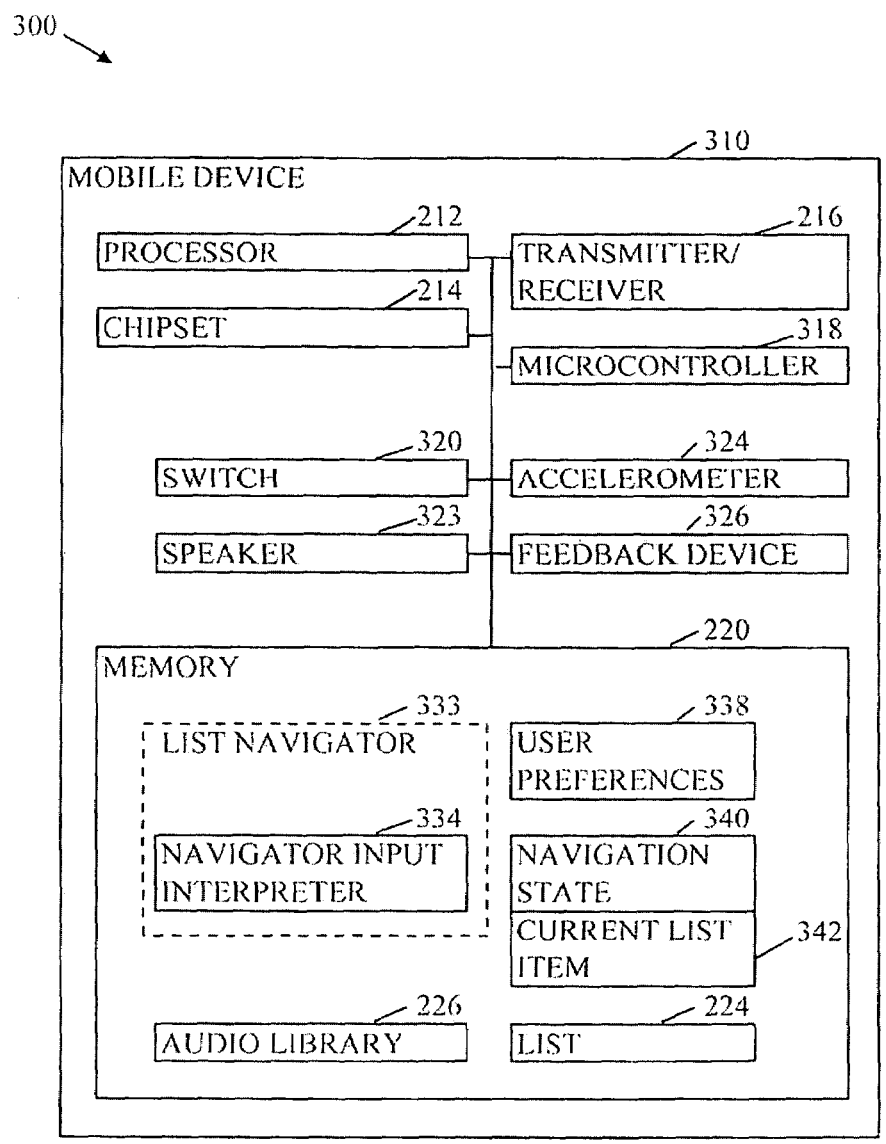
FIG. 3 depicts an alternative embodiment of a mobile device having an accelerometer and a speaker.

Looking now to FIG. 3, there is shown an alternative embodiment 300 of a mobile device 310. Mobile device 310 may be any type of portable device such as a PDA, a cellular phone, a Netbook, a Nettop, or the like. As with mobile device 210 of FIG. 2, mobile device 310 comprises a processor 212, a chipset 214, and a transmitter/receiver 216 and a memory 220. Mobile device 310 also comprises a microcontroller 318, a switch 320, a speaker 323, a motion sensor 324, a feedback device 326, as well as a list navigator 333 adapted for use with the mobile device 310.

Microcontroller 318 may be a specific purpose device adapted to accelerate functions related to list navigator 333. In particular, microcontroller 318 may process code and data in lieu of transmitting the code and data to processor 212, which may have additional processing duties that are not related to the list navigator 333. For example, in some embodiments, microcontroller 318 may process raw motion sensor data via a navigator input interpreter 334, determine changes in a navigation state 340, select audible indicators associated with one or more list items of a list 224, determine a skip count for a variable skip count resolution, determine a level of hierarchy for audible indicators associated with the list 224, or the like. The functionality performed by the microcontroller 318 varies between embodiments from the execution of a single function to the execution of all functions related to the list navigator 333.

The switch 320 may provide an indication from the user that the user is selecting a list item from the list 224. The switch 320 may be a spring-loaded button or a software enabled button utilizing at least a portion of a touch screen on the mobile device 310. In other embodiments, the switch 320 may be voice-activated or otherwise remotely activated.

The speaker 323 may annunciate or sound audible indicators to inform the user of the navigation state 340 as well as the current list item 342 or grouping for list items of the list 224. In some embodiments, speaker 323 may comprise an audio jack to output the audible indicators to a headset.

Motion sensor 324 may generate data to describe movement of the mobile device 310 and, in particular, tilt of the device, e.g., to the left or right. Motion sensor 324 may comprise a 3-D accelerometer chip or other type of motion sensor and may couple with microcontroller 318 via a bus. In many embodiments, the motion sensor 324 may couple directly with microcontroller 318 via the bus. In many embodiments, rather than integrating an accelerometer into the mobile device 310 to generate the data to describe movement of the mobile device 310, the embodiments may integrate another type of motion sensor such as a gyroscope, a tilt sensor, or a number of tilt switches.

Feedback device 326 may comprise a mechanism for providing feedback to the user in a form other than audio. For instance, the feedback device 326 may comprise a vibration generator on a battery coupled with the mobile device 310. In other embodiments, the feedback device 326 may comprise a visual feedback such as a flashing light, a light emitting diode (LED), or a row of LEDs. For example, as the user increases tilt of the mobile device 310, the list navigator 333 may increase the frequency of flashes of the flashing light (which may be a portion of a display of mobile device 310), increase the intensity of light emitted by an LED, increase the number of LEDs lit in the row of LEDs, etc, to indicate either the extent of the tilt within a total range of tilt available for navigating the list or to indicate how close the tilt is to the threshold tilt necessary to advance the navigation state 340 to another navigation state such as an increased speed of traversal through the list 224.

The list navigator 333 comprises logic in the form of code and data to execute to provide a user interface for traversing the list 224. In many embodiments, the list 224 is representative of a selected list amongst a plurality of lists available to traverse. The plurality of lists may all reside within the mobile device 310, may all reside remotely from the mobile device 310, or partially within and remote from the mobile device 310.

The list navigator 33 may execute partially on microcontroller 318 and partially on processor 212 or wholly on microcontroller 318. In one embodiment, the navigator input interpreter 334 executes solely on microcontroller 318. For example, the processor 212 may receive an instruction upon powering up to execute list navigator 333. The list navigator 333 may comprise logic that when executed, facilitates navigation of the list 224 by a user via an audio mapping of the list in the form of audible indicators. The audible indicators may be representative of a single, current list item 342 in the list 224 or a group of items in the list 224 and may be sounded via the speaker 323 as the list 224 is traversed. The navigator input interpreter 334, being executed via the microcontroller 318, may receive raw data from the motion sensor 324 and interpret the data to produce navigation data. The navigation data may indicate changes in the tilt of the mobile device 310 that are indicative of navigation instructions from the user. The list navigator 333, also being executed on the microcontroller 318, may comprise a list traversal processor to interpret the navigation data from the navigation input interpreter 333 to determine whether to change the navigation state 340 to, e.g., change the navigation speed and/or the direction.

The list navigator 333 may access user preferences 338 to store or retrieve user preferences related to traversal through the list 224. For example, the user preferences 338 may identify the default list to access upon executing the list navigator 333 as well as parameters related to interpretation of the navigation data, the initial current list item 342 in the list 224, the type of navigation such as hierarchical resolution or variable skip count, and the like. The parameters related to interpretation of the navigation data may include the number of speeds available in forward or reverse, the amount of tilt required to change between navigation speeds, the tilt range within which the navigation speed reduces to zero or a Stationary position, the direction of tilt that indicates traversal toward the beginning of the list 224, the direction of tilt that indicates traversal toward the end of the list 224, and the like.

The list navigator 333 may access the navigation state 340 to determine or adjust the navigation state 340. For instance, the navigation state 340 may indicate a speed and direction of traversal of the list 224. The speed of traversal may comprise, for example, an indication of the level of hierarchical group being traversed rather that a speed indication or may comprise an indicator of speed that is associated with a hierarchical group. Alternatively, the speed of traversal may be an indication of the skip count for the variable skip count resolution.

The list navigator 333 may access the current list item 342 to track traversal through the list 224. The current list item 342 may comprise a pointer to an item in the list 224, an offset for an item in the list, a logical address for an item in the list, a physical address for an item in the list, or the like.

Figure 4:
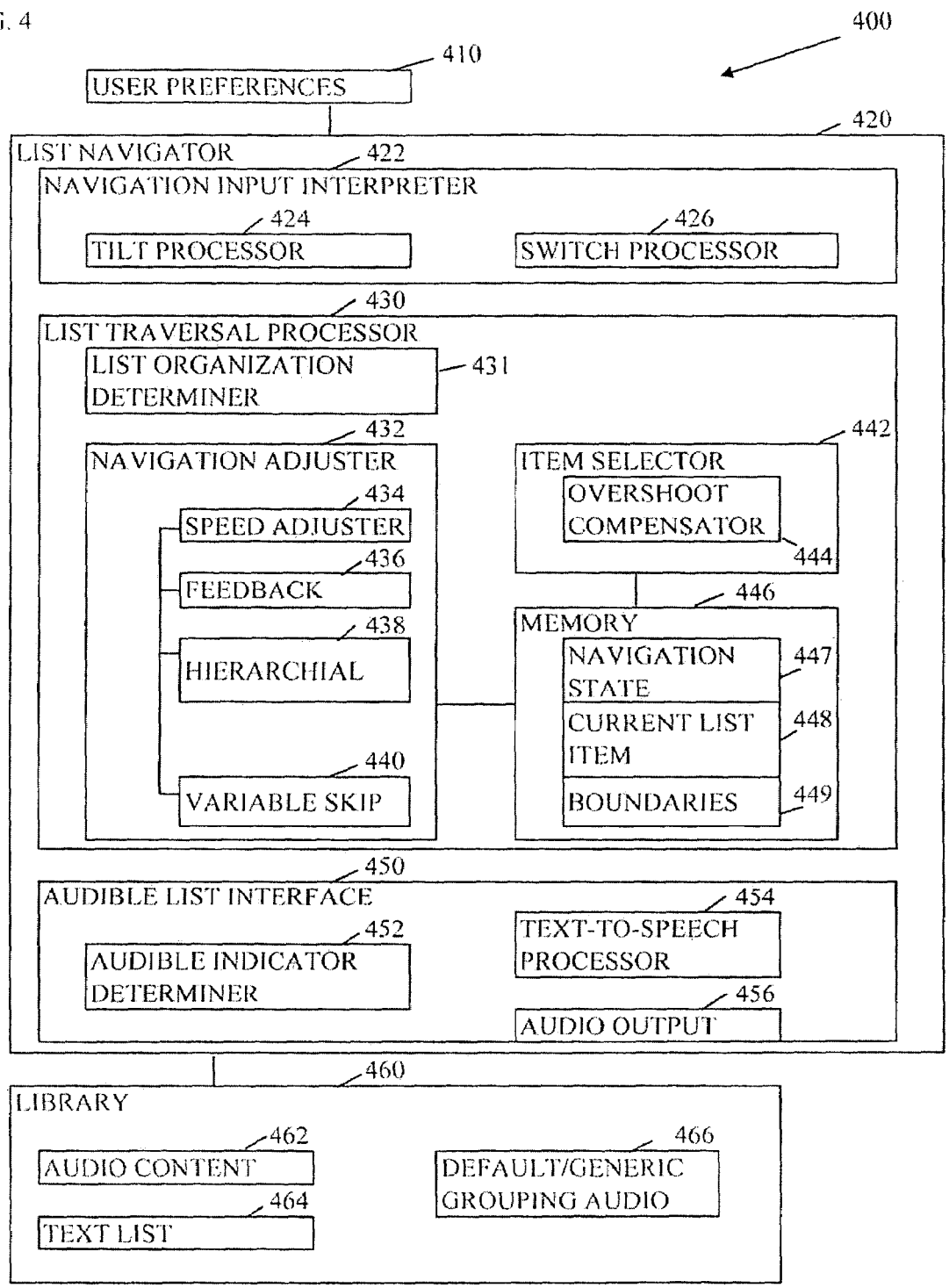
FIG. 4 depicts an embodiment of an apparatus to traverse a list via audible mapping of the list.

FIG. 4 illustrates an apparatus 400 to traverse a list 464 via audible mapping of the list 464. The apparatus 400 may comprise a module to couple with a computer such as a server, desktop, notebook, Nettop, or Netbook, to facilitate traversal of a list 464 via audible mapping. The list 464 may reside either in the device or in storage integrated with or coupled with the computer. The apparatus 400 may connect via an exterior bus or network connection such as a USB connector or an Ethernet adapter. In other embodiments, the apparatus 400 may comprise a module integrated with the computer such as hardware and/or code installed in the computer. For example, the apparatus 400 may comprise a hardware component that can be connected to a mobile device via a USB connector to provide the mobile device with the capabilities to traverse the list 464 via audible mapping of the list 464.

The apparatus 400 comprises user preferences 410, a list navigator 420, and a library 460. The user preferences 410 may comprise preferences related to interpretation of navigation data or mapping of navigation data onto navigation speeds and directions. The user preferences 410 may also comprise preferences related to other functionalities of the list navigator 420.

The list navigator 420 may comprise logic including hardware and code to facilitate traversal of the list 464 via one or more audible mappings of the list 464. For instance, the list navigator 420 may access the library 460 to select text from list 464 or audible indicators from audio content 462 that are associated with items in the list 464 and output audible indicators representative of items in the list as those items are traversed. The list navigator 420 may also present an indication of speed to the user by representing the items in the list with a hierarchical group at a level associated with the speed, presenting audible indicators representing truncated list items, presenting audible indicators representing time compressed list items, or presenting audible indicators for every Nth item in the list 464, wherein N is associated with the speed, or the like.

The list navigator 420 may comprise a navigation input interpreter 422, a list traversal processor 430, and an audible list interface 450. The navigation input interpreter 422 may interpret raw sensor data from a motion sensor that detects tilt. In many embodiments, the raw sensor data may be output by a gyroscopic sensor to indicate tilt of a user's wrist. In other embodiments, the raw sensor data may represent tilt or rotation of another limb or joint of the user such as, for example, a user's neck, head, finger, leg, or ankle.

The navigation interpreter 422 determines whether there is a detectable change in the tilt based upon the raw sensor data. In many embodiments, if there is a detectable change, the tilt processor 424 may detect and communicate that detectable change to the list traversal processor 430. In other embodiments, the tilt processor 424 may comprise more processing capabilities and may output navigation data indicative of the tilt reaching or surpassing navigation state thresholds. For instance, the tilt processor 424 may access the user preferences to determine the number of navigation speeds available for the navigation state 447. If, for instance, there are three reverse speeds, three forward speeds, and one stationary position, the tilt processor 424 may divide the useable degrees of rotation between the user rotation limits (which may be defined in user preferences 410 or may be a default setting) amongst the seven states to determine the threshold in a pattern similar to that illustrated in FIG. 1B. In some embodiments, the tilt range or rotation range associated with each state may be equal ranges of movement. In further embodiments, the tilt processor 424 may divide the useable degrees of rotation into unequal sub-ranges based upon a predetermined pattern. In many embodiments, the navigation interpreter 422 may output navigation data indicating that the tilt data reached a navigation state threshold. In further embodiments, the user preferences 410 may comprise navigation state thresholds and the tilt processor 424 may access the user preferences 410 to determine whether tilt indicated by the raw sensor data is indicative of tilt beyond a threshold.

The navigation input interpreter 422 may comprise a switch processor 426 to monitor and interpret the state of a switch such as the switch 232 in FIG. 2 or the switch 320 in FIG. 3. For example, the switch processor 426 may receive data indicating that a switch has changed state and/or that the switch has returned to a default or normal state. In response, the switch processor 426 may communicate an instruction to list traversal processor 430 to select the current list item 448.

In some embodiments, the navigation input interpreter 422 or a portion thereof may reside in a device separate from the device comprising the rest of the list navigator 420. For instance, the navigation input interpreter 422 may reside in a watch such as watch 240 in FIG. 2, or the tilt processor 424 of the navigation input interpreter 422 may reside in the watch 240 and the switch processor 426 of the navigation input interpreter 422 may reside in the lust navigator 420.

When the navigation input interpreter 422 determines the navigation data and transmits the navigation data to the list traversal processor 430, the list traversal processor 430 may determine an organization for an audible mapping for the list 464, determine adjustments to the navigation, detect selection of a current list item 448, and interact with the audible list interface 450 to communicate the audible mapping for the list 464 to the user. On the other hand, if the switch processor 426 outputs a selection signal, the list traversal processor 430 may determine a selected list item based upon the current list item 448.

The list traversal processor 430 comprises a list organization determiner 431, a navigation adjuster 432, and an item selector 442. The list organization determiner 431 may determine the organization of an audible mapping for the list 464 by accessing user preferences 410, by interacting with the user to determine a user preference, by a default setting of the list organization determiner 431, or by a default setting associated with the list 464. For instance, some lists such as list 464 may include an embedded code that indicates the default list organization. Furthermore, some embodiments of list organization determiner 431 may determine a default list organization based upon the type of list such as a playlist or a contact list, or some attribute or characteristic of the list such as a being a list associated with a menu system, a list having an associated sub-list, or the like.

The list organization determiner 431 may select from a number of different list organizations for the audible mapping of the list 464 such as a hierarchical resolution of list items or a variable skip count resolution of list items.

The navigation adjuster 432 may determine adjustments to the navigation state 447 based upon the list organization, the navigation data, and the navigation states 447. In the present embodiment, the navigation adjuster 432 comprises feedback logic 436 to generate a feedback signal to represent the speed and, in some embodiments, a direction of traversal of the navigation state 447. For example, the feedback logic 436 may output a feedback signal that increases a vibration of a feedback device in proportion to the speed with which the adjustments to the tilt of e.g., a watch are approaching a speed boundaries or thresholds of the navigation states.

In further embodiments, the feedback logic 436 may provide feedback indicative of the distance (or number of list items) the current list item 448 is from boundaries 449 of the list (e.g., the beginning or end of the list 464). For instance, the vibration frequency and/or intensity may increase as the traversal of the list 464 approaches the end of the list and the vibration frequency and/or intensity may decrease as the traversal of the list 464 approaches the beginning of the list. Note that the beginning and end of the list 464 may be relative to the initial list item in a circular queue list structure.

The navigation adjuster 432 comprises the speed adjuster 434, the feedback logic 436, a hierarchical logic 438, and a variable skip count logic 440. The speed adjuster 434 may determine whether the navigation data changes the navigation state 447 based upon the list organization and, in response to determining that a change in the navigation state 447 is indicated by the navigation data, select a method for determining a change in the speed of the navigation state 447 based upon the list organization. For instance, if the list organization is a hierarchical resolution then the speed adjuster 434 may determine whether the navigation data indicates a tilt beyond a threshold for the navigation state 447 by accessing the threshold in the user preferences 410 or determining the threshold from the user preferences 410. If the navigation data indicates a change in the navigation state 447, the speed adjuster 434 communicates with the hierarchical logic 438 to determine the change in speed and/or direction of the traversal of the list 464, stores the new state in the navigation state 447, and interacts with the audible indicator determiner 452 to determine a different level hierarchy of audible indicators.

Similarly, if the list organization is a variable step count resolution, the speed adjuster 434 may compare the tilt indicated by the navigation data against a threshold associated with a speed boundary for the navigation state 447 by accessing the threshold in the user preferences 410 or determining the threshold from the data in the user preferences 410. If the navigation data indicates a change in the navigation state 447, the speed adjuster 434 communicates with the variable skip count logic 440 to determine the change in speed and/or direction of the traversal of the list 464, stores the new state in the navigation state 447, and interacts with the audible indicator determiner 452 to determine an audible indicator for the Nth item in the list from the current list item 448, wherein N is related to the new navigation speed.

The item selector 442 may be invoked in response to receipt of the selection signal from the navigation input interpreter 442. The item selector 442 may respond by determining the list item that is the selected list item based upon the current list item 448. In some embodiments, the item selector 442 may select the current list item 448. The present embodiment, on the other hand, comprises overshoot compensator logic 444.

The overshoot compensator logic 442 may compensate for a lag time between traversing a list item and receiving a selection signal in response thereto. The delays involved vary between embodiments and may involve a delay between traversing a list item and sounding the corresponding audible indicator. Other delays may involve the lag time involved with converting text to speech as well as the lag time between sounding the audible indicator and depression of a button to generate a raw switch signal, between depression of the button and receipt of the raw switch signal by the navigation input interpreter 422, between receipt of the raw switch signal and generation of the selection signal by the switch processor 426, as well as between transmission of the selection signal and receipt of the selection signal by the item selector 442.

Some delays are more prominent in certain embodiments. For instance, delays may be enhanced when communications from the switch to the list traversal processor 430 involve Bluetooth® or other wireless communication technologies.

The overshoot compensator logic 444 may include a default compensation that, for instance, assumes that the expected lag time is 0.5 seconds. Thus, if the navigation speed is or is estimated by overshoot compensator logic 444 to be 20 items per second, the anticipated overshoot would be 10 items so the overshoot compensator logic 444 may determine that the selected item is 10 items prior to the current list item 448. In some embodiments, the user may be able to set preferred overshoot compensation or lag time in user preferences 410 and the overshoot compensator logic 444 may access the user preferences to determine the overshoot compensation or lag time. In further embodiments, the user may select different overshoot compensations or lag times based upon the specific list being traversed, a type of list being traversed, or a list that has a particular characteristic or attribute, and store those preferences in user preferences 410 for use by overshoot compensator logic 444.

In further embodiments, the user may be able to set preferences for the overshoot compensation or lag time based upon the type of activity that the user is engaged in or the configuration of the system within which apparatus 400 operates. For example, if the user is jogging, the user may find that the lag time between hearing and selecting an item is different than the lag time when performing less strenuous activities or when the user is utilizing a wired headset rather than a wireless headset.

In another embodiment, the overshoot compensator logic 444 is capable of learning a lag time for a user as an average, regardless of the activities in which the user is involved, and/or on a per activity basis. In such embodiments, the user may input the particular activity by selecting the activity from a list via list navigator 420. In yet another embodiment, the overshoot compensator logic 444 may test the user's response time for selecting an item in the list 464 and record the lag time in user preferences 410 under various conditions such as during different activities or with different wireless and/or wired system interconnections.

The audible list interface 450 may determine and output an audible indicator for a list item at a rate indicated by the navigation adjuster 432. For instance, if the navigation adjuster 432 indicates that the navigation speed is 2× Speed Forward, the audible indicator determiner 452 may determine audible indicators associated with 2× Speed, and audible list interface 450 may output the audio indicators via audio output 456 at a rate associated with 2× Speed.

The audible indicator determiner 452 may determine audible indicators for list 464 by determining an association between the list items of the text list 464 and default/generic grouping audio 466. The default/generic grouping audio 466 may comprise audible indicators for a number of levels of hierarchical groups such as (A, B, C, . . . ) or (AA-AE, AF-AJ, . . . ). For instance, when the list organization is hierarchical resolution, and the navigation speed is 2× Speed Forward, the audible indicator determiner 452 may, starting with the current list item 448, determine the hierarchical group associated with the current list item 448 and the audible list interface 450 may thereafter output the audible indicator. In response to an indication from list traversal processor 430 that the navigation speed has not changed or that the navigation speed is 2× Speed Forward, the audible indicator determiner 452 may select the next or subsequent audible indicator from the same hierarchical group that is indicative of forward movement through the list and the audible list interface 450 may output the subsequent audible indicator to represent passage from the next group of list items.

This process may continuer until reaching the end of the list 464 or receipt of an indication of a change in the navigation speed from the navigation adjuster 432. For example, the audible list indicator 452 may receive an indication from the list organization determiner 431 that the list organization has changed from hierarchical resolution to variable skip count resolution. In response, the audible indicator determiner 452 may determine the audible indicator for the current list item 448. In accordance with the variable skip count logic 440, the audible indicator determiner 452 may count N items from the current list item 448 and determine the audible indicator therefor. In the present embodiment, the audible indicator for the list item may be a text-to-speech conversion of the text in list 464 for the Nth item. Audible indicator determiner 452 may instruct text-to-speech processor 454 to convert the text to an audible indicator and then audible list interface 450 may output the audible indicator via audio output 456.

Upon receipt of a selection from the user and determining the selected list item, the list navigator 420 may execute the item. In the present embodiment, executing the selected item of list 464 may involve selecting an audio content corresponding to the list item from audio content 462 in the library 460 and outputting the audio content via audio output 456.

FIG. 5 illustrates a flow chart 500 of an embodiment for traversing a list via audible mapping of the list. The flow chart 500 may operate in conjunction with a system such as systems 100, 200, or 300 as shown in FIGS. 1A, 2, and 3. The flow chart 500 begins with receiving an indication to navigate a list (element 505). Receiving an indication to navigate a list may involve powering up the system, communicatively coupling a watch to the system, transmitting a list to the system, activating a switch, or other. For example, a user may enclose a mobile device that comprises a list navigator in a bag and press a button on a watch that is communicatively coupled with the mobile device. Pressing the button on the watch may initiate the list navigator at the most recent, current list item in the most recent list traversed. In other embodiments, the user may select the list from a number of recently traversed lists or favorite lists. In one embodiment, upon pressing the button on the watch, the list navigator may, by default, access a list of lists including the recently traversed lists, favorite lists, all known lists, and the like.

Once the user has selected the list or a list has been selected by default, the list navigator may access the list (element 510). Accessing the list may involve determining a location of the list in memory. In some embodiments, accessing the list may involve uploading all or part of the list into memory that has less access latency than the current location of the list. For example, the list may reside on a hard drive or on a network drive. In some embodiments, the list, or portions thereof, may be uploaded to memory closer to the processor or microcontroller to facilitate faster access to the items in the list.

Determining a list traversal organization (element 515) may comprise determining whether the list is to be accessed via a hierarchical resolution, a variable skip count resolution, or another method. In several embodiments, the list organization may be a default organization indicated in the user preferences of the system. In further embodiments, the list navigator may determine the list organization based upon a list organization that the user associated with this particular list.

Once the list traversal organization is determined, the list navigator may determine an audible indicator representative of the list location, which may be identified as the current list item (element 520). In other embodiments, the current list location may be the first item in the list, the most recently accessed item in the list, the most accessed item in the list or the like. For example, for a list that comprises a song title for accessing a number of songs, the current list item may default to the song that is played the most in the list. For lists that have a number of sub-lists, the most accessed item may be the most accessed sub-list. The the list navigator or other logic may store data such as the most recently accessed item or the most accessed item in user preferences, in the list structure, or other location that can be associated with the list item.

After determining the audible indicator, the list navigator may generate an audible indicator for the current list item (element 522) by accessing a default audio library to identify an audible indicator associated with the current list item or converting the current list item to speech if the current list item comprises text, and by transmitting the audible indicator to an audio output. For example, if the list organization is the hierarchical resolution and the current speed of navigation is stationary, the list navigator may annunciate the text to speech conversion of the text in the list item by transmitting the audible indicator to a speaker.

After generating the initial audible indicator, the list navigator may receive accelerometer data (element 525) and interpret the accelerometer data (element 530) to determine whether the data from the accelerometer is indicative of sufficient tilt of the accelerometer to change the navigation state for traversal of the list. For instance, the navigation state may be a state illustrated in FIG. 1C that represents the navigation speed and direction through the list. If the data from the accelerometer data indicates a change to the navigation state (element 535), the list navigator may change the navigation state by changing the hierarchical resolution with which the list is being mapped or the skip count with which the list is being mapped (element 550).

In addition to changing the navigation state, the list navigator may generate a feedback signal that is responsive to the change in the navigation state (element 555). For example, the list navigator may generate a feedback signal to transmit to a vibration generator.

On the other hand, if the data does not indicate a change (element 535), the list navigator may not change the navigation state and may not generate a feedback signal. In other embodiments, the feedback signal may be continually generated but may not change in frequency or amplitude until the list navigator identifies a change to the navigation state.

The list navigator may continually monitor for a selection of a list item (element 550). If no selection is made, the list navigator may continue to traverse the list in accordance with the navigation state by returning to element 520. If a selection is made then the list navigator may compensate for an overshoot of the selected list item (element 555) by determining a number of items passed during a delay between traversal of the selected list item and receipt of the selection, signal from a user to select the list item. The list navigator may then execute the selected list item (element 560).

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates audible list traversal. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for traversing a list to execute a selected list item, the method comprising:
   determining a list traversal organization to map the list with audible indicators;
   determining navigation data, the navigation data indicative of a direction and a speed with which to traverse the list, wherein determining the navigation data comprises:
   determining whether a clockwise tilt with respect to a stationary navigation state is associated with a forward direction of list traversal or a reverse direction of list traversal;
   receiving sensor data indicative of a tilt of a sensor; and interpreting the sensor data indicative of the tilt of the sensor to determine the navigation data;
   determining audible indicators based upon the navigation data and representative of list items within the list being traversed, wherein an audio content of the audible indicators is based upon the direction and the speed with which the list is being traversed and is based upon the list traversal organization;

outputting the audible indicators in an order with which the list items within the list are being traversed to indicate at least the direction, wherein the periodicity of the outputting in combination with the list items represented by the audible indicators being output is representative of a navigation speed with which the list is being traversed;

receiving a selection signal to indicate selection of the selected list item; and executing the selected list item.

2. The method in claim 1, further comprising transmitting instructions to activate feedback in response to an increase of the navigation speed.

3. The method in claim 1, further comprising transmitting instructions to vibrate in response to an increase of the navigation speed.

4. The method in claim 1, further comprising translating a text item within the list to speech via a text-to-speech generator.

5. The method in claim 1, further comprising compensating for an overshoot of the selected list item as a result of a lag time associated with a time period between traversal of the selected list item and receipt of the selection signal.

6. The method in claim 5, wherein compensating for the overshoot comprises calculating the overshoot based upon a default user reaction time and the navigation speed.

7. The method in claim 5, wherein compensating for the overshoot comprises calculating the overshoot based upon a learned user reaction time and the navigation speed.

8. The method in claim 1, wherein determining the audible indicators comprises calculating a number of list items to skip based upon the list organization, wherein the list organization is a variable skip count organization.

9. The method in claim 1, wherein determining the audible indicators comprises selecting a hierarchical grouping of the items in the list from more than one hierarchical groupings based upon the navigation speed, the hierarchical grouping associating an audible indicator for each group within the hierarchical grouping, wherein the list organization is a hierarchical organization and each of the more than one hierarchical groupings is associated with a navigation speed corresponding to the level of each of the more than one hierarchial groupings within the hierarchical organization.

10. An apparatus for traversing a list to execute a selected list item, the apparatus comprising:

a navigation input interpreter to receive sensor data indicative of a tilt of a sensor and interpret the sensor data indicative of the tilt of the sensor to determine the navigation data;

an audible list interface to access the list and to transmit audible indicators representative of more than one items in the list, the audible list interface comprising an audible indicator determiner to determine the audible indicators representative of more than one items in the list traversed, wherein an audio content of the audible indicators is based upon the direction and the speed with which the list is being traversed and is based upon a list traversal organization; and comprising an audio output to output signals representative of the audible indicators in an order with which corresponding list items within the list are traversed to indicate at least the direction, wherein the periodicity of outputting the signals in combination with the list items represented by the audible indicators output is representative of the speed with which the list is being traversed; and a list traversal processor to communicatively couple with the navigation input interpreter to interpret the navigation data from the navigation input interpreter to determine whether to change the navigation state, the list traversal processor comprising:

a memory to store a location of a current list item;

a navigation adjuster coupled with the memory to adjust the speed and the direction of traversal through the list based upon the indications of the changes in navigation state for the list and to couple with the audible list interface to output the audible indicators, the navigation adjuster to determine whether a clockwise tilt with respect to a stationary navigation state is associated with a forward direction of list traversal or a reverse direction of list traversal; and an item selector to interpret a selection signal to determine the selected list item based upon a current list item in response to receipt of the selection signal to execute the selected list item.

11. The apparatus in claim 10, wherein the navigation input interpreter comprises logic to determine whether the navigation data is an indication of change in the navigation state.

12. The apparatus in claim 10, wherein the item selector further comprises an overshoot compensator to compensate for an overshoot of the selected list item as a result of a lag time associated with a time period between traversal of the selected list item and receipt of the selection signal.

13. The apparatus in claim 12, wherein the overshoot compensator comprises logic to calculate the overshoot based upon a default user reaction time and the speed.

14. The apparatus in claim 12, wherein the overshoot compensator comprises logic to calculate the overshoot based upon a learned user reaction time and the speed.

15. The apparatus in claim 10, wherein the audible indicator determiner comprises logic to calculate a number of list items to skip based upon the list traversal organization, wherein the list traversal organization is a variable skip count organization.

16. The apparatus in claim 10, wherein the audible indicator determiner comprises logic to select a hierarchical grouping of the items in the list from more than one hierarchical groupings based upon the speed, the hierarchical grouping associating an audible indicator for each group within the hierarchical grouping, wherein the list traversal organization is a hierarchical organization and each of the more than one hierarchical groupings is associated with a navigation speed corresponding to the level of each of the more than one hierarchial groupings within the hierarchical organization.

17. A system for traversing a list to execute a selected list item, the system comprising:

a library comprising audio content associated with the list;

a list navigator to couple with the library to map a list with audible indicators based upon a list traversal organization to facilitate traversal of the list by determining the audio indicators based upon items of the list, the list navigator to traverse the list in response to interpretation, by the list navigator that determines whether a clockwise tilt with respect to a stationary navigation state is associated with a forward direction of list traversal or a reverse direction of list traversal, of navigation data from a sensor that senses tilt to determine changes in a navigation state, wherein the navigation state indicates a direction and a speed of traversal of the list, the list navigator to transmit the audible indicators to a speaker to output the audible indicators to represent the direction and the speed of traversal of the list as well as the location within the list to map the list, wherein the list navigator, in response to receipt of a selection signal, determines the selected list item based upon item identified as the current list item and executes the selected list item.

18. The system in claim 17, wherein the list navigator comprises a navigation input interpreter to receive navigation data and to determine whether the navigation data is an indication of change in the navigation state.

19. The system in claim 17, wherein the list navigator comprises an overshoot compensator to compensate for an overshoot of the selected list item as a result of a lag time associated with a time period between traversal of the selected list item and receipt of the selection signal.

20. The system in claim 19, wherein the overshoot compensator comprises logic to calculate the overshoot based upon a default user reaction time and the speed.

21. The system in claim 19, wherein the overshoot compensator comprises logic to calculate the overshoot based upon a learned user reaction time and the speed.

22. The system in claim 17, wherein the list navigator comprises an audible indicator determiner to calculate a number of list items to skip based upon the list traversal organization, wherein the list traversal organization is a variable skip count organization.

23. The system in claim 17, wherein the list navigator comprises an audible indicator determiner to select a hierarchical grouping of the items in the list from more than one hierarchical groupings based upon the speed, the hierarchical grouping associating an audible indicator for each group within the hierarchical grouping, wherein the list traversal organization is a hierarchical organization and each of the more than one hierarchical groupings is associated with a navigation speed corresponding to the level of each of the more than one hierarchical groupings within the hierarchical organization.

24. A computer program product for audible list traversal, wherein the computer program product does not comprise a transitory signal, the computer program product comprising:
    a computer useable medium having a computer useable program code embodied therewith, the computer useable program code comprising: computer useable program code configured to perform operations, the operations comprising:
    determining a list traversal organization to map the list with audible indicators;
    determining navigation data, the navigation data indicative of a direction and a speed with which to traverse the list, wherein determining the navigation data comprises:
        determining whether a clockwise tilt with respect to a stationary navigation state is associated with a forward direction of list traversal or a reverse direction of list traversal;
        receiving sensor data indicative of a tilt of a sensor; and
        interpreting the sensor data indicative of the tilt of the sensor to determine the navigation data;
    determining audible indicators based upon the navigation data and representative of list items within the list being traversed, wherein an audio content of the audible indicators is based upon the direction and the speed with which the list is being traversed and is based upon the list traversal organization;
    outputting the audible indicators in an order with which the list items within the list are being traversed to indicate at least the direction, wherein the periodicity of the outputting in combination with the list items represented by the audible indicators being output is representative of a navigation speed with which the list is being traversed;
    receiving a selection signal to indicate selection of the selected list item; and
    executing the selected list item.

25. The computer program product in claim 24, wherein the operations further comprise transmitting instructions to activate feedback in response to an increase of the navigation speed.

26. The computer program product in claim 24, wherein the operations further comprise transmitting instructions to vibrate in response to an increase of the navigation speed.

27. The computer program product in claim 24, wherein the operations further comprise translating a text item within the list to speech via a text-to-speech generator.

28. The computer program product in claim 24, wherein the operations further comprise compensating for an overshoot of the selected list item as a result of a lag time associated with a time period between traversal of the selected list item and receipt of the selection signal.

29. The computer program product in claim 28, wherein compensating for the overshoot comprises calculating the overshoot based upon a default user reaction time and the navigation speed.

30. The computer program product in claim 28, wherein compensating for the overshoot comprises calculating the overshoot based upon a learned user reaction time and the navigation speed.

* * * * *